United States Patent

Hatano et al.

[11] Patent Number: 5,500,687
[45] Date of Patent: Mar. 19, 1996

[54] CHROMINANCE SIGNAL SEPARATOR USING CHROMINANCE SIGNAL CORRELATION

[75] Inventors: Takahisa Hatano, Sapporo; Yoshihisa Nishigori, Itami, both of Japan

[73] Assignee: Matsushita Electric Industrial Co., Ltd., Osaka, Japan

[21] Appl. No.: 327,317

[22] Filed: Oct. 21, 1994

[30] Foreign Application Priority Data

Oct. 22, 1993 [JP] Japan .................................. 5-264594

[51] Int. Cl.$^6$ .................................................. H04N 9/78
[52] U.S. Cl. ........................ 348/663; 348/713; 348/665
[58] Field of Search .................................... 348/663, 665, 348/666, 667, 669, 713; 358/31; H04N 9/77, 9/78

[56] References Cited

U.S. PATENT DOCUMENTS

| | | |
|---|---|---|
| 4,646,133 | 2/1987 | Blanchard et al. .................. 358/11 |
| 4,930,012 | 5/1990 | Fujita .................................. 348/666 |
| 5,264,923 | 11/1993 | Bhang ................................ 348/665 |

FOREIGN PATENT DOCUMENTS

| | | |
|---|---|---|
| 590831 | 4/1994 | European Pat. Off. . |
| 4-81192 | 3/1992 | Japan . |
| 4-81191 | 3/1992 | Japan . |
| 2244885 | 12/1991 | United Kingdom . |
| 2247589 | 3/1992 | United Kingdom . |

OTHER PUBLICATIONS

Search Report.

*Primary Examiner*—James J. Groody
*Assistant Examiner*—Sherrie Hsia
*Attorney, Agent, or Firm*—Ratner & Prestia

[57] ABSTRACT

A chrominance signal can be separated from a composite color television signal without misdetection in correlation detection even when the chrominance signal level is small by calculating vertical correlation values, comparing them with the threshold value corresponding to the chrominance signal level and judging if there is correlation or not. A chrominance signal separating apparatus includes a cascade connection of delay devices, where each delay device delays an input signal by 1H period. Comb filters separate a luminance signal and a chrominance signal from the composite color television signal by inputting two signals from the input and the output of each delay device which have a 1H period time difference. The output of one of the delay devices is regarded as a reference signal. A correlation detecting circuit calculates correlation values between the reference signal and a signal at the vertical vicinity of the reference signal on the screen. A level detecting circuit detects the level of the composite color television signal. Comparators compare the output of the correlation detecting circuit and the output of the level detecting circuit. A mixing circuit mixes the outputs of the comb filters based on the output of the comparators.

1 Claim, 3 Drawing Sheets

CHROMINANCE SIGNAL SEPARATOR USING CHROMINANCE SIGNAL CORRELATION

BACKGROUND OF THE INVENTION

1. Field of the Invention

The present invention relates to chrominance signal separating apparatus for separating a chrominance signal from a composite color television signal.

2. Description of the Prior Art

Recently, progress of digital signal processing technique accompanies that an adaptive type chrominance signal separating apparatus which selects a plurality of filters according to existence of correlation between an arbitrary reference signal and the signals at the vicinity of the position of the reference signal in a horizontal or vertical direction on the screen in a chrominance signal separating apparatus which separates a chrominance signal from a composite color television signal.

FIG.1 is a block diagram of a chrominance signal separating apparatus in accordance with the prior art.

A band pass filter 301 extracts a chrominance signal component from a composite color television signal (hereafter, called VBS signal, which means video burst signal). Each one of 1H delay devices 302 and 303 delays a signal by 1H period, where 1H means one horizontal period. In digital circuits, memory devices are usually used as delay devices. A comb filter 304 separates a chrominance signal from the output signal of the band pass filter 301. A comb filter 305 separates a chrominance signal from the signal delayed from the output signal of the band pass filter 301 by 1H period and the signal delayed from the output signal of the band pass filter 301 by 2H periods.

An adder 306 adds the output signal of the band pass filter 301 and the output signal of the delay device 302 which is delayed from the output signal of the band pass filter 301 by 1H period. An adder 307 adds the output signal of the 1H delay device 302 which is delayed from the output signal of the band pass filter 301 by 1H period and the output signal of the 1H delay device 303 which is delayed from the output signal of the band pass filter 301 by 2H periods.

Absolute value circuits 308 and 309 output absolute values of the output signals of the adders 307 and 306, respectively. Low pass filters 310 and 311 filter the output signals of the absolute value circuits 308 and 309, respectively and output their average values. Comparators 312 and 313 compares the output signals of the low pass filters 310 and 311 with an arbitrary threshold value and judges which correlation is stronger. A smaller average value means stronger correlation. A mixing circuit 314 mixes the output signals of the comb filters 304 and 305 according to the output of the comparators 312 and 313.

A chrominance signal is extracted from a VBS signal at the band pass filter 301. The extracted chrominance signal component is applied to the delay devices 302 and 303 in order and one input signal to the delay device 302 and the two output signals from the deley devices 302 and 303 are applied to the two comb filters 304 and 305. Because each comb filter 304 and 305 is supplied with two signals which have an 1H period time difference, the output of each comb filter becomes a chrominance signal. While, the two signals which have an 1H period time difference are added at the adders 307 and 306, the sums are outputted to the following absolute value circuits 308 and 309, the absolute value signals are filtered at the low pass filters 310 and 311 and average values of the absolute values are outputted from the low pass filters 310 and 311, respectively. These values are vertical correlation values. The vertical correlation values are compared with an arbitrary threshold value k' at the comparators 312 and 313. Here, if the correlation value is smaller than the threshold value k', it is judged to have correlation. The mixing circuit 314 mixes the outputs of the comb filters 304 and 305, based on the outputs of the comparators 312 and 313. For example, an optimum chrominance signal is obtained by adopting the output of the comb filter which has correlation if there is some correlation in either output, or adopting the average value of the outputs of the two comb filters 304 and 305 if there is no correlation in both outputs.

However, the above-described configuration has a problem which misjudgment occurs in correlation judgment when the chrominance signal level is small, because the threshold value to be compared with the correlation value is fixed to k'.

SUMMARY OF THE INVENTION

To solve the above problem, a chrominance signal separating apparatus of the present invention includes (1) a cascade connection of delay devices, each one of which delays a signal by 1H period; (2) a plurality of comb filters for separating a chrominance signal from a composite color television signal; (3) correlation detecting circuits for outputting correlation values between the reference signal and the signal at the vertical vicinity of the position corresponding to the reference signal, regarding the signal at the central junction point of the cascade connected delay devices as a reference signal, if the number of the delay devices is even and the junction point just ahead of or just behind the central delay device of the cascade connected delay devices as a reference signal, if the number of the delay devices is odd; (4) a level detecting circuit for detecting a composite color television level; (5) comparators for comparing the output of the correlation detecting circuit and the output of the level detecting circuit; and (6) a mixing circuit for mixing the outputs of the comb filters according to the output of the comparators.

According to the present invention, a chrominance signal can be separated using an optimum filter and without misdetection of correlation even when the chrominance signal level is small.

DETAILED DESCRIPTION OF THE INVENTION

Figure 1:
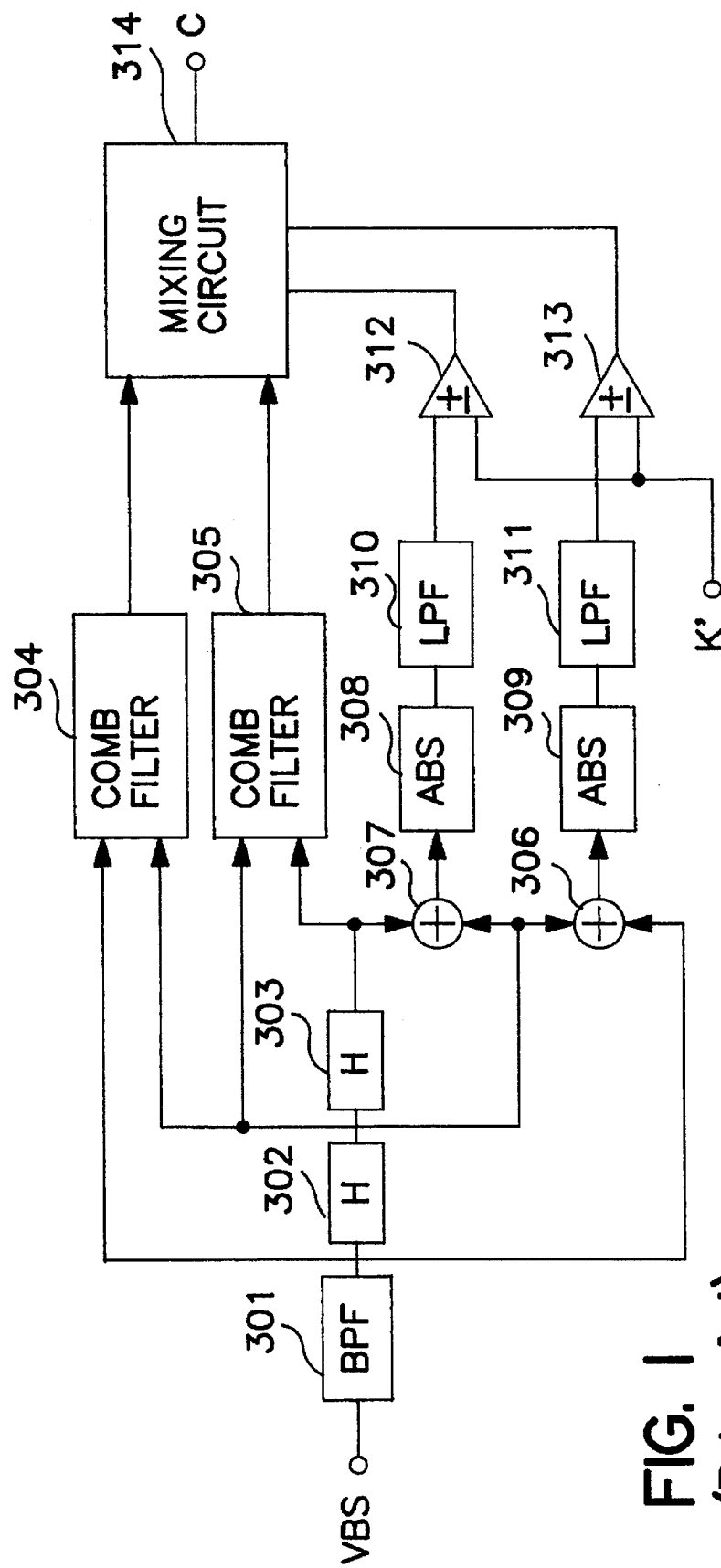
FIG.1 is a block diagram of a chrominance signal separating apparatus in accordance with the prior art.
Figure 2:
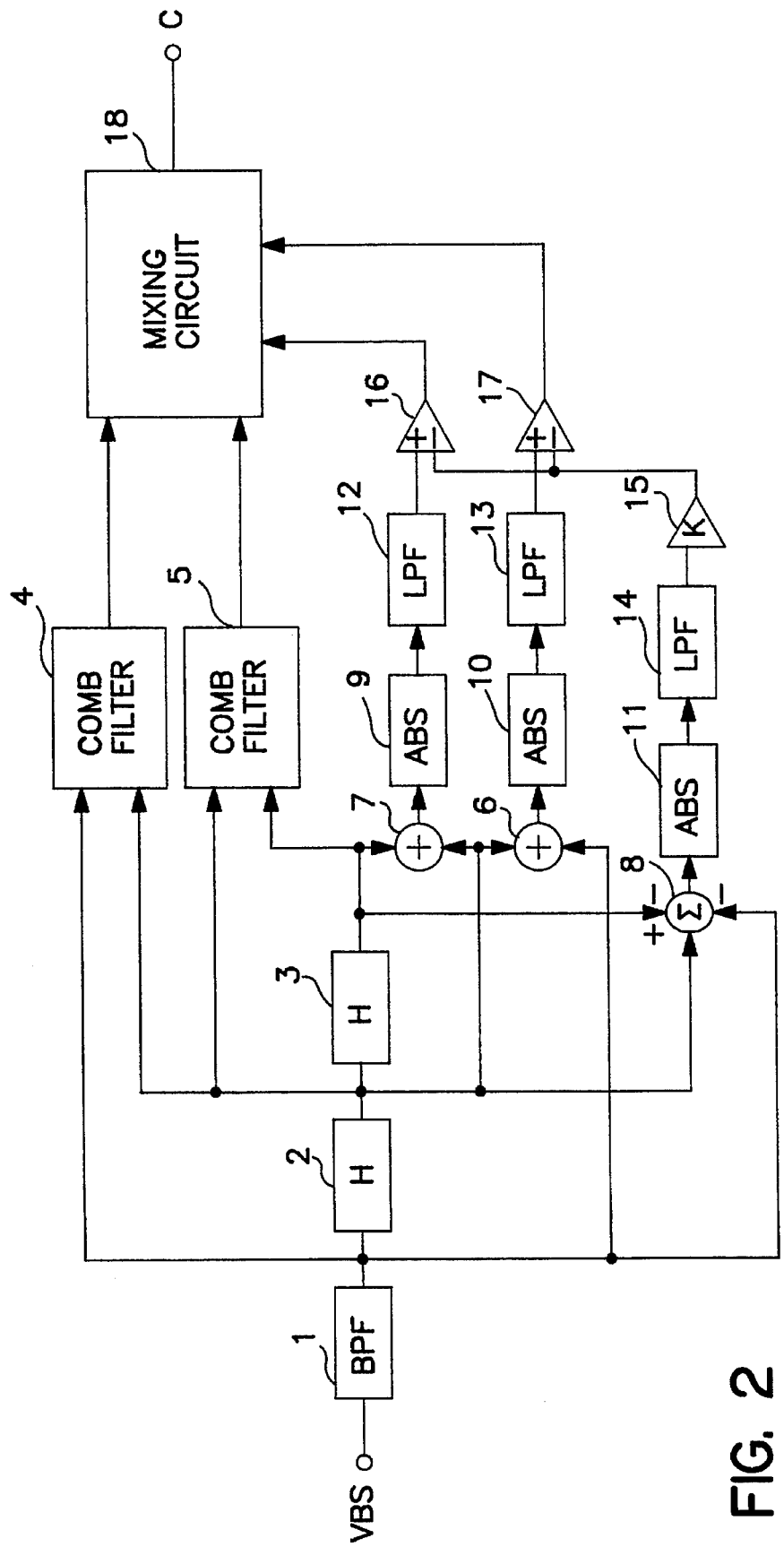
FIG.2 is a block diagram of a chrominance signal separating apparatus in accordance with an exemplary embodiment of the present invention.

FIG.2 is a block diagram of a chrominance signal separating apparatus in accordance with an exemplary embodiment of the present invention.

A bandpas filter 1 extracts a chrominance signal component. 1H delay devices 2 and 3 delay a signal by 1H period. A comb filter 4 separates a chrominance signal from an output signal of the bandpass filter 1 and a signal delayed by 1H period from the output signal of the bandpass filter 1. A comb filter 5 separates a chrominance signal from a signal delayed by 1H period from the output signal of the bandpass filter 1 and a signal delayed by 2H periods from the output signal of the bandpass filter 1.

An adder 6 adds the output signal of the bandpass filter 1 and the signal delayed by 1H period from output signal of the bandpass filter 1. An adder 7 adds the signal delayed by 1H period from the output signal of the bandpass filter 1 and the signal delayed by 2H periods from the output signal of the bandpass filter 1. An operating circuit 8 calculates a chrominance signal level from the input signal of the delay device 2 and the output signals of the delay devices 2 and 3. Absolute value circuits 9, 10 and 11 output absolute values of the output signals of the adders 7 and 6 and the operator 8, respectively. Low pass filters 12, 13 and 14 filter the output signal of the absolute value circuits 9, 10 and 11, respectively and output their average values. A converting circuit 15 multiplies the output signal of the low pass filter 14 by a multiplying factor k and converts to a threshold value. Comparators 16 and 17 compare the output signals, which are correlation values, with the threshold values. A mixing circuit 18 mixes the output signals of the comb filters according to the output signals of the comparators 16 and 17.

The adder 7, the absolute value circuit 9 and the low pass filter 12 form a correlation detecting circuit. The adder 6, the absolute value circuit 10 and the low pass filter 13 form another correlation detecting circuit. The operator 8, the absolute value circuit 11 and the low pass filter 14 form a level detecting circuit.

Figure 3:
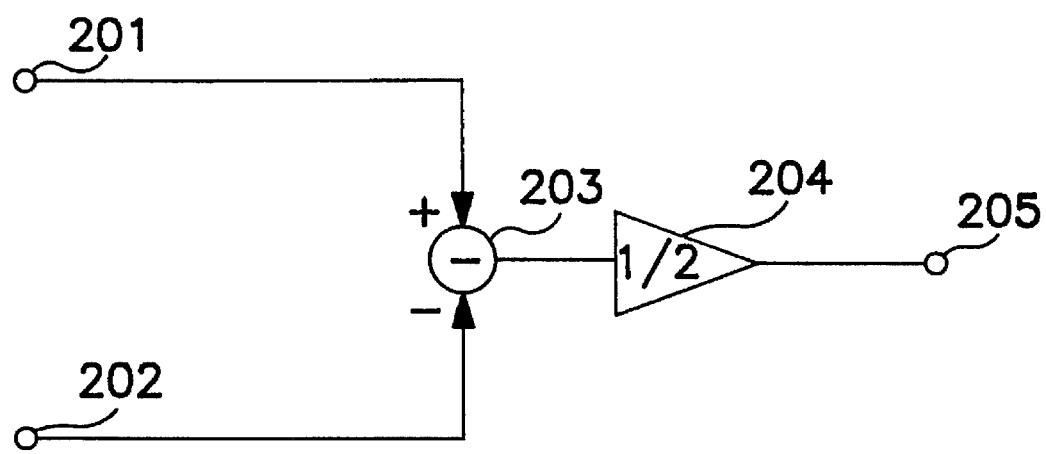
FIG.3 is a block diagram of a comb filter used in a chrominance signal separating apparatus in accordance with the exemplary embodiment of the present invention.

FIG.3 is a block diagram of a comb filter used in a chrominance signal separating apparatus in accordance with the exemplary embodiment of the present invention. A signal 201 is a signal delayed by 1H period from the output of the bandpass filter 1. A signal 202 is a signal apart from (ahead of or behind) the signal 201 by 1H period. A subtracter 203 subtracts the signal 202 from the signal 201. A divider 204 outputs a half value of the output of the subtracter 203. A chrominance signal 205 is obtained as an output signal of the divider 204.

A chrominance signal is extracted from the VBS signal at the bandpass filter 1. The extracted chrominance signal component is applied to the delay devices 2 and 3 in order and one input signal to the delay device 2 and the two output signals from the delay devices 2 and 3 are applied to the two comb filters 4 and 5. Because each comb filter 4 and 5 is supplied with two signals which have an 1H period time difference, a chrominance signal is obtained at the output of each comb filter. A sum signal of the input and output signals of the delay device 2 which have an 1H period time difference is made at the adder 6. Another sum signal of the input and output signals of the delay device 3 which have also an 1H period time difference is made at the adder 7. Then, absolute values and average values for the sum signals are obtained at the following absolute value circuits 9 and 10 and at the low pass filters 12 and 13, respectively. The outputs of the low pass filters 12 and 13 are vertical correlation values.

In the operating circuit 8, the output signal of the bandpass filter 1 and the signal delayed by 2H periods from the output signal of the bandpass filter 1 (which is an output of the delay device 3) are subtracted from the signal delayed by 1H period from the output signal of the bandpass filter 1 multiplied by factor 2 and a chrominance signal level is extracted. The extracted chrominance signal level is outputted as an average value of the absolute value after passing through the absolute value circuit 11 and the low pass filter 14. Then, the signal is multiplied by factor k at the converting circuit 15 and converted to a threshold value. The output signals of the low pass filters 12 and 13 which are vertical correlation values are compared with the threshold values at the comparators 16 and 17, respectively.

If the correlation value is smaller than the threshold value, it is judged to have some correlation. Because the threshold value is derived from a chrominance signal level, the correlation value is small when the signal level is small, but correct correlation judgment can be done because of small threshold value. At the mixing circuit 18, the output signals of the comb filters 4 and 5 are mixed based on the outputs of the comparators 16 and 17 and then, a chrominance signal is outputted.

Thus, according to an exemplary embodiment of the present invention, a chrominance signal separating apparatus without misdetection in correlation detection even when the video signal level is small can be realized by using an optimum filters.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A chrominance signal separating apparatus comprising:
   a cascade connection of a plurality of delay means, wherein a first delay means receives a composite color television signal and delays the composite color television signal by a horizontal period and each succeeding delay means, other than said first delay means, delays an output signal generated by a preceding delay means by the horizontal period and a signal output by one of said plurality of delay means is a reference signal;
   a plurality of comb filters for receiving said composite color television signal and output signals from said plurality of delay means and for separating a chrominance signal from said composite color television signal;
   a plurality of correlation detecting means for receiving said composite color television signal and the output signals from said plurality of delay means and for calculating correlation values between said reference signal and a signal at the vertical vicinity of said reference signal on a screen;
   level detecting means for receiving said composite color television signal and the output signals from said plurality of delay means and for detecting a chrominance signal level;
   a plurality of comparing means for comparing the outputs of said correlation detecting means with the output of said level detecting means; and
   mixing means for mixing the outputs of said comb filters according to the outputs of said plurality of comparing means.

* * * * *